US008272040B2

(12) United States Patent
Chaudhry et al.

(10) Patent No.: US 8,272,040 B2
(45) Date of Patent: Sep. 18, 2012

(54) PREVENTING INADVERTENT LOCK-OUT DURING PASSWORD ENTRY DIALOG

(75) Inventors: Gaurav Chaudhry, Cary, NC (US); Jeffrey B Jennings, Cavis, CA (US); Carlo A. Matos, Cary, NC (US); Robert M. Morgan, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 865 days.

(21) Appl. No.: 12/361,974

(22) Filed: Jan. 29, 2009

(65) Prior Publication Data

US 2010/0192205 A1 Jul. 29, 2010

(51) Int. Cl.
G06F 7/04 (2006.01)
G08B 23/00 (2006.01)

(52) U.S. Cl. .................... 726/7; 726/5; 726/22; 726/25; 380/277

(58) Field of Classification Search ................ 726/5, 22, 726/25, 7; 380/277
See application file for complete search history.

(56) References Cited

U.S. PATENT DOCUMENTS

| | | | |
|---|---|---|---|
| 5,559,505 A | 9/1996 | McNair | |
| 6,799,286 B1 | 9/2004 | Evans et al. | |
| 6,883,095 B2 | 4/2005 | Sandhu et al. | |
| 6,950,949 B1 * | 9/2005 | Gilchrist | 726/19 |
| 7,073,067 B2 | 7/2006 | Mizrah | |
| 2002/0067832 A1 * | 6/2002 | Jablon | 380/277 |
| 2004/0034801 A1 | 2/2004 | Jaeger | |
| 2005/0044390 A1 | 2/2005 | Trostle | |
| 2005/0114705 A1 | 5/2005 | Reshef et al. | |
| 2005/0154926 A1 * | 7/2005 | Harris | 713/202 |
| 2005/0273625 A1 * | 12/2005 | Dayan et al. | 713/184 |
| 2006/0041756 A1 * | 2/2006 | Ashok et al. | 713/183 |
| 2007/0101150 A1 * | 5/2007 | Oda | 713/183 |
| 2007/0234062 A1 | 10/2007 | Friedline | |
| 2008/0072302 A1 * | 3/2008 | Parkinson | 726/9 |
| 2008/0282091 A1 * | 11/2008 | Ashok et al. | 713/183 |
| 2010/0115583 A1 * | 5/2010 | Delia et al. | 726/2 |
| 2010/0162385 A1 * | 6/2010 | Wildensteiner | 726/18 |

* cited by examiner

*Primary Examiner* — Krista Zele
*Assistant Examiner* — Tamara Teslovich
(74) *Attorney, Agent, or Firm* — Cynthia G. Seal; Jeffrey L. Streets

(57) ABSTRACT

One embodiment provides a computer-implemented method for providing controlled access to electronic content. A password is associated with electronic content, such as by password-protecting an electronic file that contains the electronic content. At least one password attempt is received in an effort to access the electronic content. Each password attempt is compared to the password at a selected subset of "trap" character positions. Up to a threshold number of password entries is allowed that have incorrect characters at any of the trap character positions. A greater number or even an unlimited number of incorrect password entries are allowed having incorrect characters at non-trap character positions. Access to the electronic content is allowed only if one of the password entries exactly matches the password.

14 Claims, 7 Drawing Sheets

| Attempt # | | | | | | | | | Correct? (Y/N) | Total incorrect entries counted toward threshold (Max 3 allowed) | |
|---|---|---|---|---|---|---|---|---|---|---|---|
| | M | Y | D | O | G | B | O | B | | | |
| | 1 | 2 | 3 | 4 | 5 | 6 | 7 | 8 | | | |
| 1 | M | Y | C | A | T | B | I | L | L | N | 1 | "Attempt Logged." |
| | 1 | 2 | 3 | 4 | ⑤ | ⑥ | ⑦ | ⑧ | | | |
| 2 | M | Y | D | O | G | B | I | L | L | N | 2 | "Attempt Logged." |
| | 1 | 2 | 3 | 4 | ⑤ | ⑥ | ⑦ | ⑧ | | | |
| 3 | M | Y | P | I | G | S | A | M | | N | 3 | "Attempt Logged." |
| | 1 | 2 | 3 | 4 | ⑤ | ⑥ | ⑦ | ⑧ | | | |
| 4 | M | Y | F | R | O | G | J | O | E | N | 4 | "Access Denied." |
| | 1 | 2 | 3 | 4 | ⑤ | ⑥ | ⑦ | ⑧ | | | |

*FIG. 6*

| Attempt # | | | | | | | | | Correct? (Y/N) | Total incorrect entries logged (Max 3 allowed) | |
|---|---|---|---|---|---|---|---|---|---|---|---|
| | M | Y | D | O | G | B | O | B | | | |
| | 1 | 2 | 3 | 4 | 5 | 6 | 7 | 8 | | | |
| 1 | N/① | Y/2 | D/③ | O/4 | G/⑤ | B/6 | O/7 | B/⑧ | N | 1 | "Attempt Logged." |
| 2 | M/① | T/2 | D/3 | O/4 | G/⑤ | B/⑥ | O/⑦ | B/8 | N | 1 | "Try Again" |
| 3 | M/① | Y/② | D/3 | O/4 | G/5 | B/6 | O/⑦ | B/⑧ | Y | → | "Access Granted." |

FIG. 7

PREVENTING INADVERTENT LOCK-OUT DURING PASSWORD ENTRY DIALOG

BACKGROUND OF THE INVENTION

1. Field of the Invention

The present invention relates to using passwords to control access to electronic content.

2. Background of the Related Art

Passwords are commonly used to control access to electronic content. For example, electronic content may be stored on a computer system in one or more password-protected files. Efforts are made to restrict knowledge of the password to authorized users of the electronic content. In a familiar example, the electronic content is an account holder's account information stored on a server of a merchant or creditor. The account holder may access the account information over the Internet by first supplying the correct password. Other familiar examples include the use of passwords to restrict log-in access to computers and portable electronic devices, and/or to restrict access to selected files on the computers and portable electronic devices by password-protecting the selected files.

For as long as passwords have been in use, people have tried to circumvent password protection to gain unauthorized access to the password-protected content. For example, an unauthorized user will sometimes attempt to discover or guess a password. The process of "brute-forcing" a password involves making repeated, often randomly-generated guesses until the correct password is eventually determined. A computer may be employed in brute-forcing efforts due to its ability to generate many guesses in a short period of time.

To thwart efforts to guess or brute-force a password, password protection schemes will commonly "lock out" access to the electronic content after a certain number of incorrect password attempts. However, even authorized users will sometimes make incorrect password attempts, such as if the authorized user mistypes a password and has to re-enter it, or forgets the password and has to try several possibilities. Getting locked out can be very inconvenient for authorized users. When access is locked out, access can no longer be achieved by merely entering the correct password, and additional measures must be taken before access is restored. For example, an account holder may have to contact a merchant to supply additional identification information, or a network computer user may have to solicit the assistance of a busy network administrator, so the merchant or network administrator can restore user accessibility of the electronic content.

BRIEF SUMMARY OF THE INVENTION

One embodiment of the present invention provides a computer-implemented method for receiving and processing a series of password attempts. A subset of character positions are selected for each password attempt. Access to electronic content is allowed in response to one of the password attempts exactly matching the password if a threshold number of password attempts has not been exceeded having an incorrect character at any of the selected subset of character positions. However, more than the threshold number (and potentially an unlimited number) of password attempts are allowed having incorrect characters only at character positions other than the selected subset of character positions. Another embodiment provides a computer program product including a computer usable medium storing program code operable to cause a computer to perform the above method.

BRIEF DESCRIPTION OF THE SEVERAL VIEWS OF THE DRAWINGS

FIG. 6 is another sample dialog using the password and GUI of FIG. 5, illustrating that access is denied for exceeding the threshold number of incorrect attempts.

FIG. 7 is a sample dialog wherein a different subset of trap characters is selected in response to each incorrect password entry.

DETAILED DESCRIPTION OF THE INVENTION

The present invention includes systems and methods for password-protecting any of a wide variety of electronic content, devices or systems in a manner that reduces the likelihood of an authorized user being locked out during a password entry dialog. Although the invention will be described below in terms of access to electronic content, it should be understood that methods described are equally applicable to electronic devices and systems, such as a home or auto security system. Upon reading the following description of the present invention in the context of electronic content, those having ordinary skill in the art will be able to readily implement the invention in other systems, devices and contexts.

In one embodiment of the invention, a password is associated with electronic content to be protected. Each password entry is compared with the password at a selected subset of character positions (alternatively referred to herein as the "trap character positions"). The number of incorrect password attempts having an incorrect character at any of the subset of (trap) character positions are counted toward an allotted threshold number of incorrect password attempts of this type (i.e., incorrect trap character). However, a greater number or even an unlimited number of incorrect password attempts are allowed when the incorrect password attempts are of the type having one or more incorrect characters only at character positions other than the selected subset of character positions (i.e. incorrect characters in the "non-trap character positions"). If the number of incorrect password attempts of either type exceeds the corresponding threshold number, access will be denied and the user may be locked out. If the correct password is entered before either threshold number is exceeded, access is granted to the protected electronic content.

In one embodiment, the user may be allowed an unlimited number of "guesses" at the characters preceding the selected subset of character positions. Such an approach presumes that an authorized user will get the whole password correct if he or she gets the initial portion of the password characters correct. By contrast, an unauthorized user attempting to brute-force the password may eventually get the first portion correct, but will almost never get the latter portion correct within the allotted threshold number of guesses. The approach taken in another embodiment is to vary the selected subset of character positions in response to each incorrect password attempt, in order to increase security. The number of character positions included in the selected subset may be sufficient that the user will not be locked out so long as the user gets most of the password correct most of the time. Other alternative approaches are also covered in the following discussion in connection with the accompanying figures.

Figure 1:
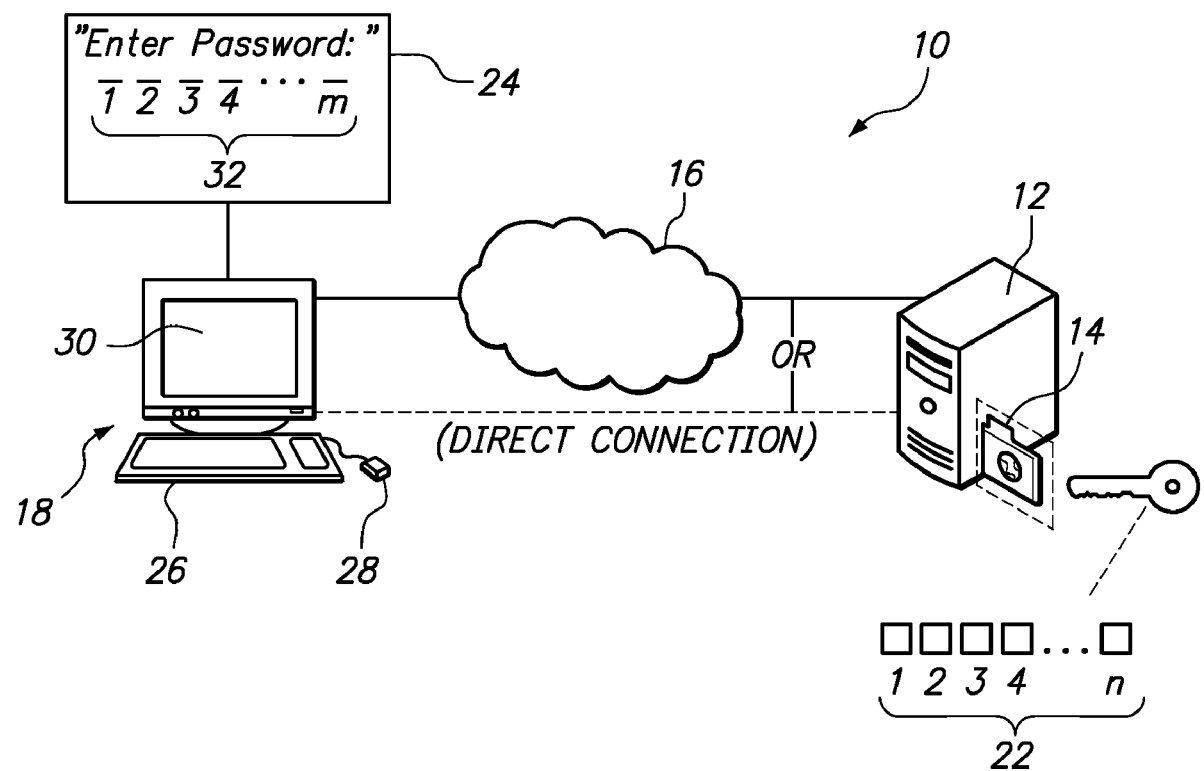
FIG. 1 is a schematic diagram of a system for providing selective access to electronic content according to an example embodiment of the invention.

FIG. 1 is a schematic diagram of a system 10 for providing selective access to electronic content according to an example embodiment of the invention. The term electronic content encompasses any electronically stored information, including but not limited to directories, files, records, fields, and application programs. Account information stored on a remote server and accessible over the Internet, the content of a password-protected word-processing document on a local computer, or an operating system accessible through a logon screen are all examples of password-protected electronic content.

The electronic content in this embodiment is contained within an electronic file 14 stored on a computer 12. The computer 12 may be a remote computer, such as a server, accessible from user input/output peripherals 18 over a network 16. The network 16 may be, for example, a local area network (LAN), a wide area network (WAN), a wireless network, or the Internet. The peripherals 18 may include, for example, a keyboard 26, a mouse, trackball, joystick, or other pointing device 28, and a display 30 for interfacing with the computer 12. The peripherals 18 may be included with another computer having its own processing and memory hardware. Alternatively, the user peripherals 18 may be included with a workstation having minimal processing and/or memory capabilities that uses the processing and memory of the computer 12. The peripherals 18 may also be included with or otherwise in direct electronic communication with the computer 12, rather than over the network 16. For example, the computer 12 may be a desktop or "personal" computer (PC), a portable "laptop" computer, thin client, or a portable electronic device such as a personal digital assistant (PDA) or cell phone, wherein the peripherals 18 are integrated with or directly connected by electronic power and content cables to the computer 12.

A password 22 is associated with the electronic file 14 in a manner that requires entering the password 22 to access the content contained within the electronic file 14. The password 22 may be any combination of alphabetic, numeric and symbolic characters. In some systems, a space, other keystroke or other entry may be acceptable within a password. Furthermore, the term "password" encompasses, but is not limited to, a passcode or a passphrase.

A graphical user interface (GUI) 24 is selectively displayed on the display 30. The GUI 24 prompts for a user to enter the password 14 or a portion thereof, typically in response to the user endeavoring to access the content. The user may be an authorized user or an unauthorized user, as the case may be. The user input to this prompt is referred to as the password attempt 32. The password attempt 32 is a string of characters asserted by the user to be the password 14 or the portion thereof. The computer 12, according to an application program, compares the password attempt 32 to the password 22. The computer 12 will only allow access to the password-protected file 14 in response to the password attempt 32 exactly matching the password 22, as represented in the diagram by a key symbol. A method and variations thereof are further described below that may be carried out by the system 10 for conditionally allowing certain incorrect password attempts (i.e., a password attempt 32 that does not exactly match the password 22) to account for the potential for human error without compromising the security of the password-protected file 14.

Figure 2:
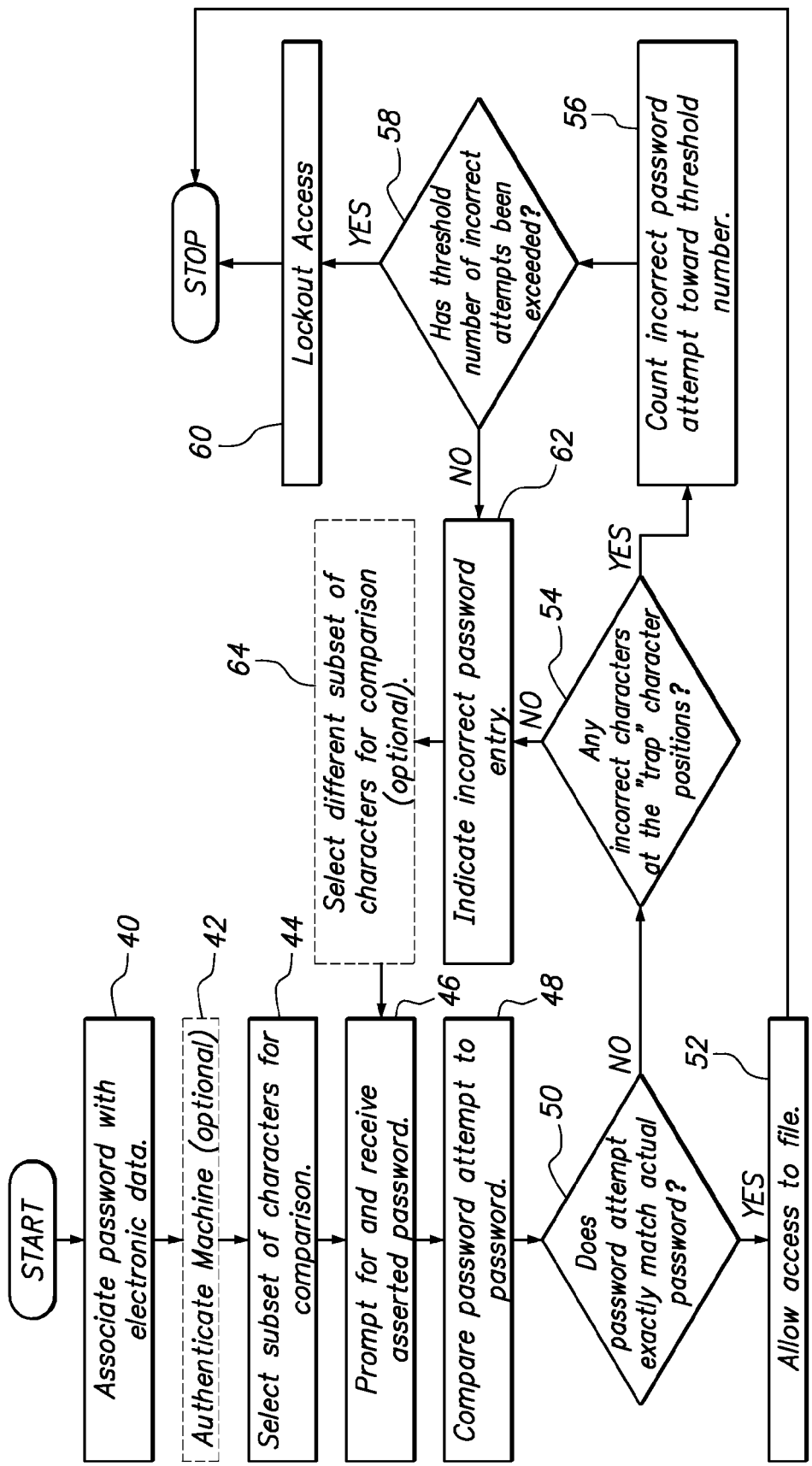
FIG. 2 is a flowchart generally outlining a method of providing selective access to electronic content according to an example embodiment of the invention.

FIG. 2 is a flowchart generally outlining a method of providing selective access to electronic content according to an example embodiment of the invention. The method may be implemented, for example, using software provided on the computer 12 of FIG. 1, such as an operating system or application program. The software may include computer-executable instructions which, when executed by the computer, cause the computer to perform the method.

In step 40, electronic content is password-protected by associating a password with the electronic content in such a manner that the electronic content may subsequently be accessed only if a user enters the correct password. The electronic content may be contained within one or more electronic files, and the password may be associated, more specifically, with those files. To accomplish step 40, a user may select the electronic content to be protected and select and input the password to be associated with the electronic content. The user who later attempts to access the electronic content may be, but is not required to be, the same user who selected the password. For example, a computer administrator may be the user who selects a password to restrict access to electronic content stored on a server. Alternatively, a computer may generate the password and inform the authorized user of the password.

Step 42 is an optional step or subroutine of authenticating the computer with which the user is communicating to ensure that the user is communicating with an "authorized machine" in charge of controlling access to the protected content. Authenticating the computer prevents, for example, inadvertently providing the sensitive information to a rogue server that may be masquerading as the authorized machine. This step may help thwart phishing, which is the process of attempting to acquire sensitive information such as usernames, passwords, or account information by masquerading as a trustworthy entity in an electronic communication. An example subroutine for authenticating the computer is discussed below in connection with FIG. 3.

In step 44, a subset of characters of the password, alternatively referred to as the "trap characters," is selected. The number of trap characters is fewer than the total number of characters in the password. Each character of the password (both trap characters and non-trap characters) may be designated by its character position. A character position is the relative position in which a particular character appears in the password. For example, if the password is "qwerty," the "q" is in the first character position, the "w" is in the second character position, the "e" is in the third character position, and so on. The character positions of the selected subset of (trap) characters may be referred to as the selected subset of character positions, or, alternatively, as the "trap character positions." The trap characters may be consecutive. For example, for the password "qwerty," the trap characters may be "r," "t," and "y," which are in the fourth, fifth, and sixth positions of the password, respectively Alternatively, the trap characters may be non-consecutive, and may even be randomly selected for each password attempt. For example, the trap characters may be "q," "r," and "y," which are in the first, fourth, and sixth character positions of the password.

In step 46, a user is prompted to enter a password. For example, a GUI may be displayed on a computer monitor, with a field in which the user can input (e.g. by typing or speaking) the asserted password. The field may or may not delineate the number of characters in the password. For example, the displayed field may include space for six characters if the password is six characters long. Alternatively, to make it more difficult to guess the password, the field may not indicate how many characters are in the password, and may allow for the entry of a greater number of characters than are included in the password, so that the length of the password cannot be inferred from the field. The asserted password or portion thereof that is entered by the user is referred to as the "password attempt," because even a careful, authorized user having knowledge of the password can make a mistake. Thus, a password attempt may either be a correct password attempt or an incorrect password attempt.

In step 48, the password attempt is compared with the password that is associated with the electronic content. According to conditional step 50, if the password attempt exactly matches the password, then access to the electronic file will be granted in step 52. If the password attempt does not exactly match the password, then conditional step 54 queries whether there is an incorrect character at any of the selected subset of (trap) character positions. If there is an incorrect character at any of the selected subset of character positions, then step 56 specifies counting the incorrect password attempt toward an allotted "threshold" number of incorrect attempts of this type. The threshold number is typically preselected and may be, for example, in the range of between three and ten. Then, in step 58, the number of incorrect password attempts of this type that have been counted according to step 56 is compared to the allotted threshold number. For example, if the threshold number is three, then a maximum of three total incorrect attempts will be allowed having an incorrect character at any of the selected subset of character positions. If the threshold number has been exceeded, then access is locked out according to step 60. However, a greater number—and preferably, as in the flowchart of FIG. 2, an unlimited number—of incorrect password attempts may be allowed having no incorrect character at any of the selected subset of character positions. Thus, if the incorrect password attempt contained no incorrect character at any of the selected subset of (trap) character positions, then the incorrect password attempt may be indicated to the user, but the incorrect password attempt is not counted toward the threshold number, in step 62.

Assuming access has not been locked out according to step 60, then the process may continue from step 54 or from conditional step 58 back to step 46, namely prompting for and receiving another password attempt. The process may continue as outlined in the flowchart until either the threshold number has been exceeded per step 58 and access is prevented, or until one of the password attempts exactly matches the password per step 50 and access is allowed. This process allows the user to guess, or otherwise get wrong, any characters that are not in the selected subset of character positions for an unlimited number of attempts.

Figure 3:
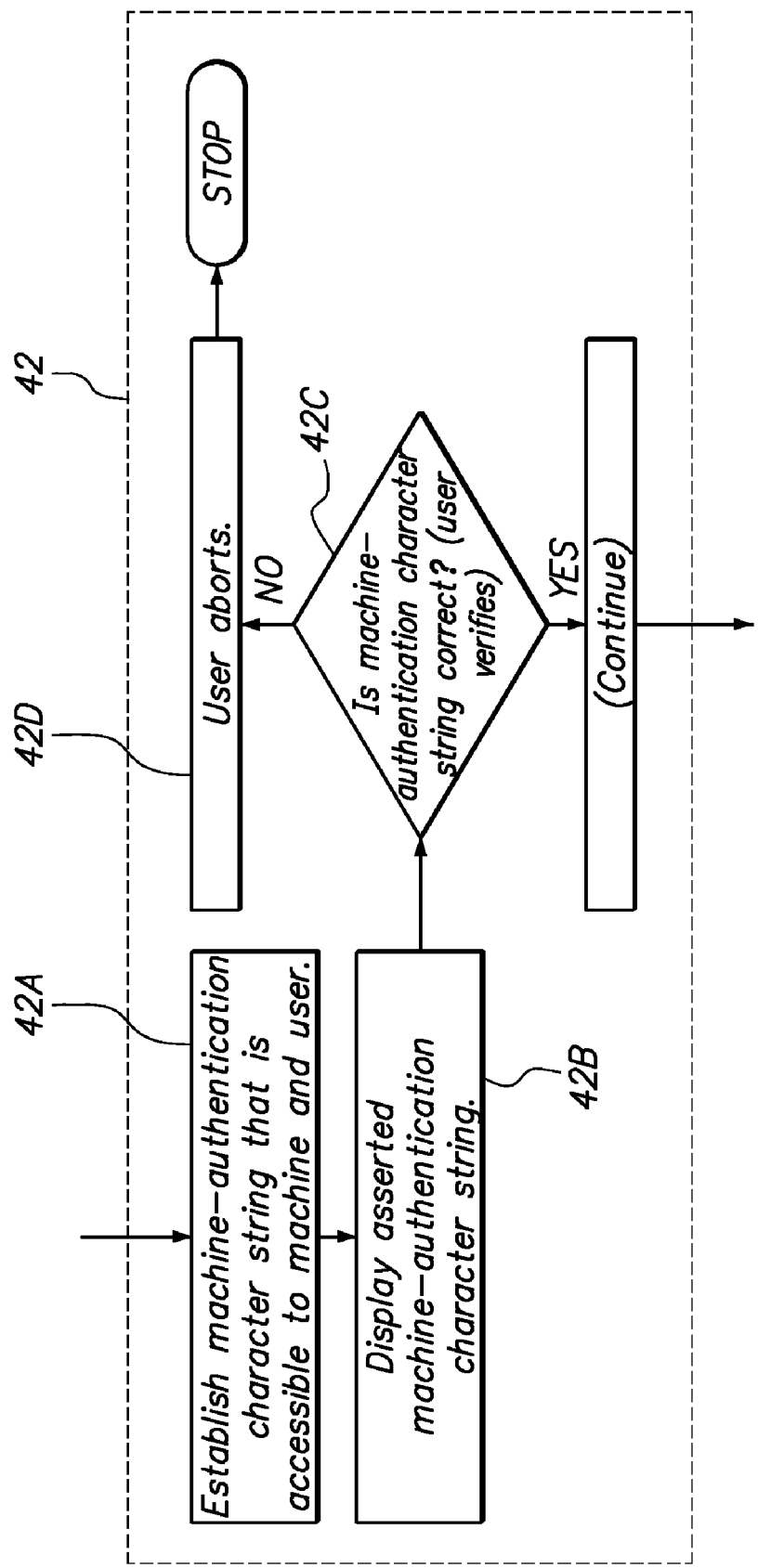
FIG. 3 is a flowchart outlining an example of a subroutine for authenticating the machine with which the user intends to be interfacing to access the password-protected electronic content.

Expanding on the discussion of step 42 in FIG. 2, FIG. 3 provides a flowchart outlining an example subroutine for authenticating the machine (e.g. computer or server) with which the user intends to be interfacing to access the password-protected electronic content (i.e. the authorized machine). Step 42A of the authentication subroutine involves establishing a machine-authentication character string that is known to the user. The machine-authentication character string may be a word, a phrase, or any other character string. The machine-authentication character string may be selected by an authorized user or it may be selected by the authorized machine or another person and made available to an authorized user. The authorized machine also has access to the machine-authentication character string (e.g. by storing the machine-authentication character string in memory), and will use the machine-authentication character string to identify itself to a user as the authorized machine.

In step 42B, a machine—which may be the authorized machine prior to authentication—displays a character string asserted to be the machine-authentication character string. Conditional step 42C queries whether the machine-authentication character string is correct, which is determined by the user. If the user is an authorized user, the user has access to the correct machine-authentication character string, and will therefore be able to determine if that user is interfacing with the authorized machine according to whether the correct machine-authentication character string is being displayed. If the machine is not authorized, such as if a rogue machine is masquerading as the authorized machine, then the correct machine-authentication character string will not be displayed and the user can abort the information transaction in step 42D before supplying any sensitive information, such as a password.

Figure 4:
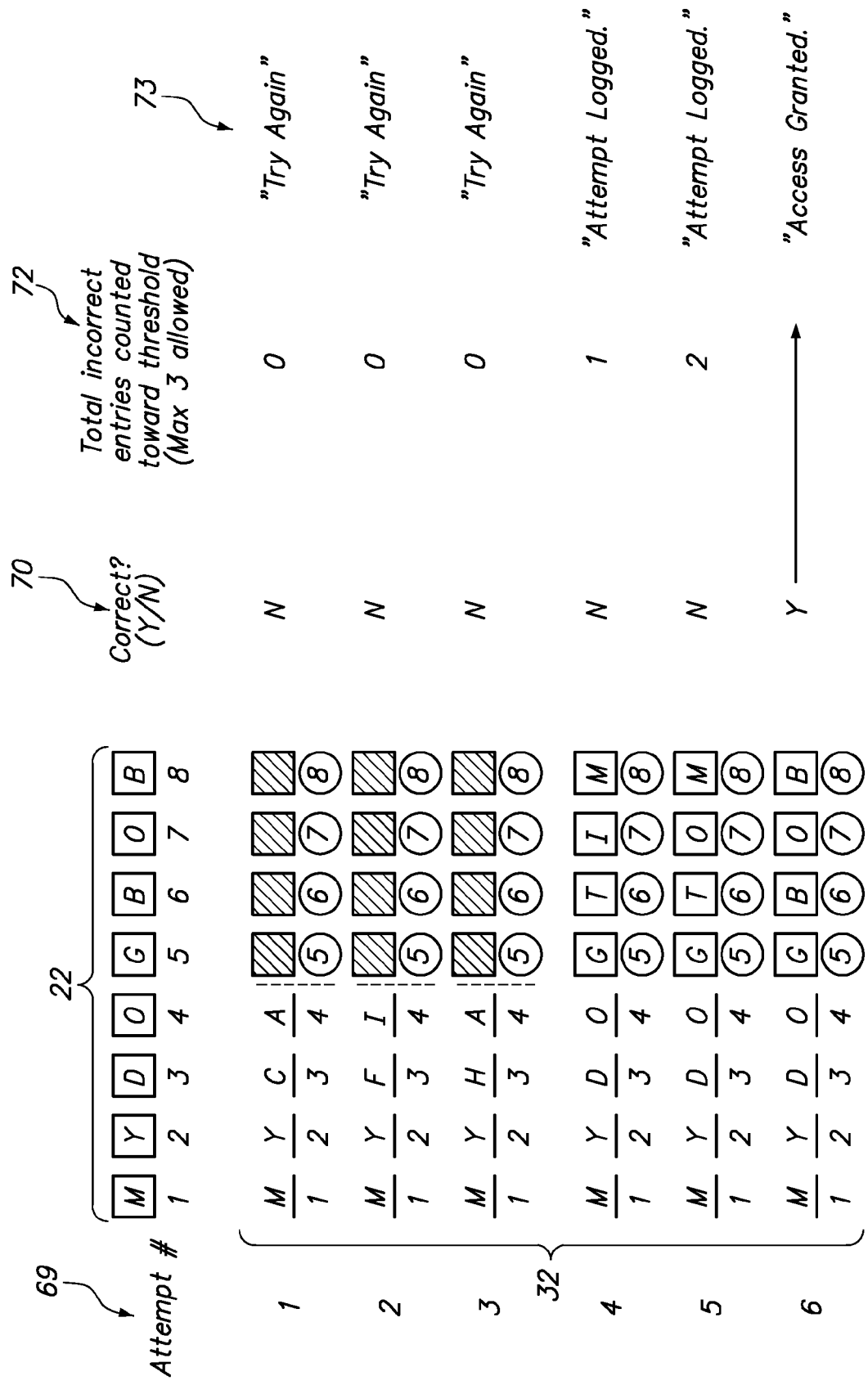
FIG. 4 is a sample dialog between a user and a computer wherein the user is prompted an unlimited number of times for entry of an initial portion of a password.

FIG. 4 is a sample dialog between a user and a computer wherein the user is prompted an unlimited number of times for entry of an initial portion of a password. The password 22 in this example is MYDOGBOB. The characters in this password are capitalized for clarity, although one skilled in the art will appreciate that passwords may or may not be case-sensitive. The password 22 is written out in FIG. 4 for reference in this discussion, but is not typically displayed to the user. The password MYDOGBOB has eight characters in eight respective character positions, which have been numbered horizontally from 1 to 8 for purposes of illustration. The initial portion of the password does not contain any of the selected subset of (trap) characters.

A series of password attempts 32 are sequentially received from a user. The password attempts 32 may be displayed on a graphical user interface (GUI). A total of six password attempts 32 are shown in this sample dialog. The password attempts are numbered vertically from 1 to 6 in the "attempt #" column 69, in the order in which the password attempts 32 are received. The character positions of the password attempts 32 are numbered horizontally, and are vertically aligned with the characters of the password 22, for ease of reference. A selected subset of character positions 5-8 (i.e., the trap character positions in this example) are indicated as circled. The remaining character positions 1-4 are the non-trap character positions in this example.

Each password attempt 32 is compared with the password 22 to determine whether the password attempt 32 matches the password 22. Character positions 5-8 may be blocked off until the first four characters have been correctly entered. In this sample dialog, four password attempts are received before the correct first-four characters "MYDO" are finally entered. The first three password attempts are incorrect. In response to each of the first three incorrect password attempts, the GUI optionally displays "try again" in column 73, without counting these incorrect password attempts toward the threshold. Eventually, password attempt #4 supplies the correct first four characters "MYDO", in response to which the remaining character positions 5-8 are made accessible.

Having received the correct first four character of the password, the remaining characters in the selected subset of character positions 5-8 may be received. However, only a limited, threshold number of incorrect password attempts will be allowed having an incorrect character at any of the selected subset of character positions 5-8. In this example, the threshold number is three, meaning that up to three incorrect password attempts will be allowed having an incorrect character at any of selected subset of character positions 5-8. The significance of this to the user is that the user is allowed to make no more than three incorrect password attempts having an incorrect character at any of the selected subset of character positions 5-8 once the first four characters have been correctly entered.

Each password attempt that contains an incorrect character at any of selected subset of character positions 5-8 is counted toward the threshold, as tabulated in column 72, and a message such as "attempt logged" may be displayed in the GUI to indicate that the incorrect entry counts toward the threshold number. Password attempts #4 and #5 both count toward the threshold. Password attempt #6 is the correct password. Because the threshold number has not been exceeded, access is thereby granted to the password-protected electronic content, as optionally indicated in the GUI and as shown in the column 73.

The option of confirming the correct first four characters before allowing entry of the remaining 4 characters will assist an authorized user in recalling the second four characters. For example, even if an authorized user is initially unsure of the correct password, the authorized user is more likely to get the correct password after refreshing his or her memory by confirming the first portion of the password. However, even though an unlimited number of incorrect guesses are allowed for the first four (non-trap) characters, a brute-force method would still require cycling through many possible character combinations to arrive at the correct first four characters, which would be more time intensive than brute-forcing a four-character password. Furthermore, a brute-force approach is statistically unlikely to get the second four (trap) characters correct within the allotted threshold number.

Although the sample dialog in this embodiment allows an unlimited number of attempts at entering the correct first four characters of the password 22, another embodiment may specify a second, larger threshold limiting the number of attempts at entering the first four characters. For example, the user may be allowed fifty or one hundred or some other second threshold number of attempts at guessing the first four (non-trap) characters. This second threshold number, although not unlimited, would preferably be large enough that an authorized user is still very likely to get the first four (non-trap) characters correct before exceeding the second threshold number.

Figure 5:
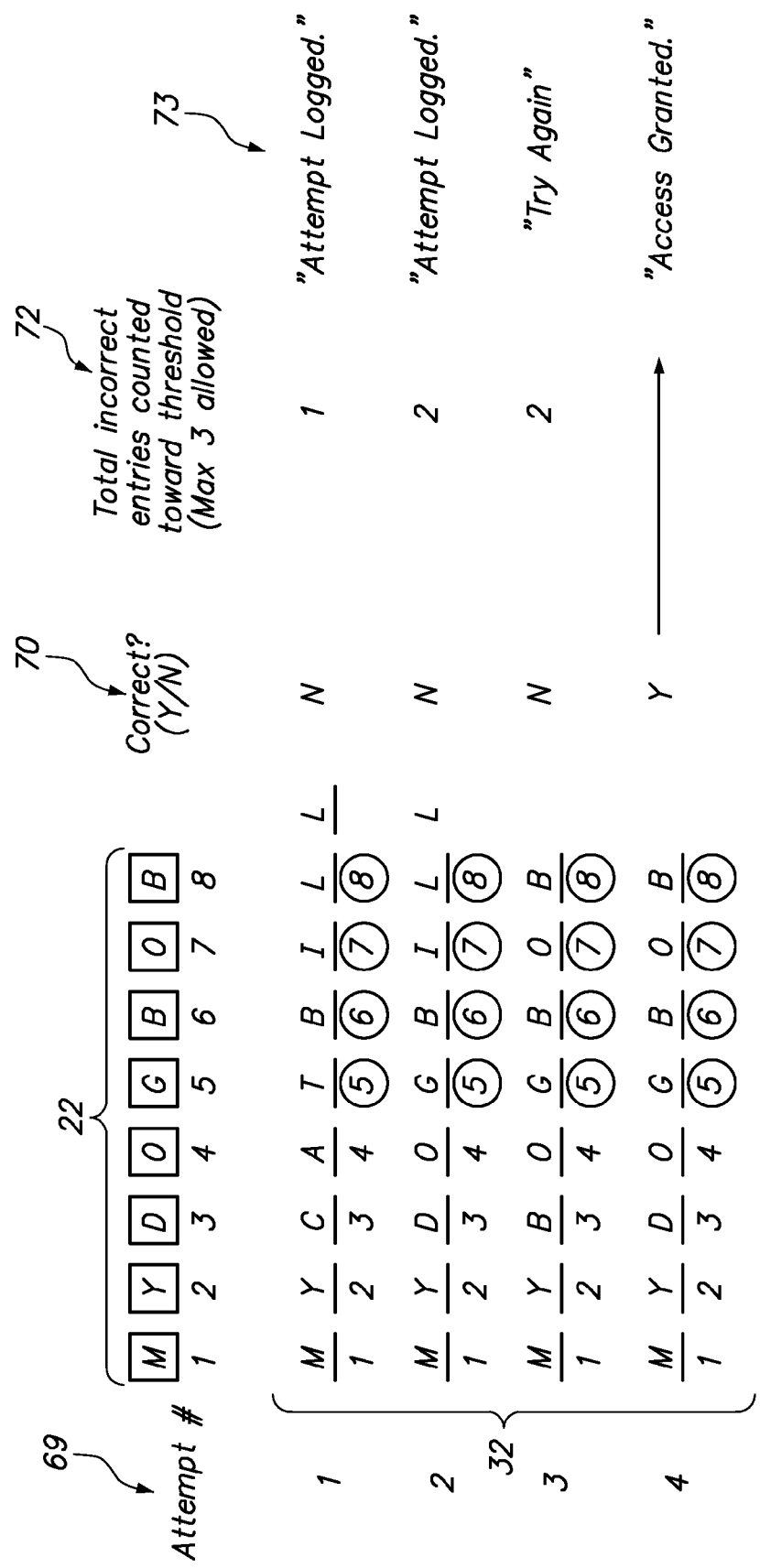
FIG. 5 is a sample dialog between a user and a computer wherein the user is prompted from the outset to enter the entire password, including characters in trap character positions.

FIG. 5 is a sample dialog between a user and a computer wherein the user is prompted to enter the entire password attempt from the outset. The password 22 in this example is again MYDOGBOB, with eight characters in eight respective character positions numbered horizontally from 1 to 8. A series of password attempts 32 are again sequentially received from a user. A total of four password attempts 32 are shown in this sample dialog, corresponding to four password attempts numbered vertically from 1 to 4 in the "attempt #" column 69. The character positions of the password attempts 32 are also numbered horizontally, and are vertically aligned with the characters of the password 22, for ease of reference.

The GUI field allows the entry of the full password, and includes space for additional characters, so as not to reveal the length of the correct password. Each password attempt 32 is compared with the password 22 to determine whether the password attempt 32 equals the password 22. Moreover, each password attempt 32 is compared with the password 22 at a subset of (trap) character positions, which in this example are character positions 5-8. In this sample dialog, an unlimited number of incorrect password attempts are allowed having incorrect characters only at the (non-trap) character positions 1-4. However, each incorrect password attempt having an incorrect character at any of the trap character positions 5-8 are counted toward the threshold, which is again three in this example.

In password attempt #1, the first password attempt is received, having incorrect characters at trap character positions 5, 7, and 8. This password attempt counts toward the threshold number of three because it has an incorrect character in at least one of the trap character positions 5-8, and specifically at trap character positions 5, 7, and 8. Password attempt #2 has incorrect characters at trap character positions 7 and 8, and is therefore also counted toward the threshold. Password attempt #3 has an incorrect character at non-trap character position 3, but has no incorrect character at any of the trap character positions 5-8. Thus, although the third password attempt is incorrect, it does not count toward the threshold. Finally, password attempt #4 exactly matches the password, and access is granted to the password-protected electronic content.

FIG. 6 is another sample dialog using the password and GUI of FIG. 5, illustrating the prevention of access in response to exceeding the threshold number of incorrect attempts. The selected subset of (trap) character positions for each password attempt again includes character positions 5-8. Each of the incorrect password attempts includes an incorrect character at one or more of the trap character positions 5-8, and therefore counts toward the threshold number. The threshold number of three attempts is reached at password attempt #3. In password attempt #4, the fourth incorrect password attempt is received having incorrect characters at one or more trap character positions (specifically, at trap character positions 5-8). Access to the password-protected content is therefore denied, and the user may be locked out. Thus, the user no longer has the privilege to access the electronic content by simply entering the correct password. Another authorized user having an administrative privilege may be required to restore the privilege of the locked-out user to access the electronic content.

FIG. 7 is a sample dialog wherein the subset of characters (i.e., the trap characters) is dynamically selected. In particular, the trap character positions are selected in response to each incorrect password attempt. The trap character positions may optionally be randomly generated. A threshold number of three incorrect password attempts are again allotted having an incorrect character at any of the trap character positions. For password attempt #1, the selected (trap) character positions are character positions 1, 3, 5, and 8. The first character of the first password attempt does not match the first character of the password. Because the first character of the password is a trap character, the incorrect password attempt counts toward the allotted threshold number of this type of incorrect password attempt.

A new subset of (trap) character positions 1, 5, 6, and 7 are selected for password attempt #2. Although the second password attempt is incorrect, none of the characters are incorrect at the trap character positions. Thus, the second password attempt does not count toward the threshold.

For password attempt #3, yet another subset of (trap) character positions 1, 2, 7, and 8 are selected. Password attempt #3 is the correct password, and because the allotted threshold number of three incorrect password entries has not been exceeded, access to the password-protected electronic content is granted in response to receiving the correct password.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium is a tangible medium that may be, for example, an electronic, magnetic, optical, electromagnetic, infrared, or semiconductor system, apparatus, or device. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the invention.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but it not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method, comprising:
receiving a series of password attempts;
selecting a subset of character positions for each password attempt;
for each password attempt, receiving an initial portion of the password from a user that precedes a first of the selected subset of character positions and receiving the remainder of the password only in response to a correct entry of the initial portion of the password;
allowing access to electronic content in response to one of the password attempts exactly matching the password and a threshold number of password attempts having an incorrect character at any of the selected subset of character positions has not been exceeded; and
allowing more than the threshold number of password attempts having incorrect characters only at character positions other than the selected subset of character positions.

2. The computer-implemented method of claim 1, further comprising allowing an unlimited number of password attempts having incorrect characters only at character positions other than the selected subset of character positions.

3. The computer-implemented method of claim 1, further comprising: for each password attempt, prompting for the entire password and allowing entry of any number of characters as the password attempt.

4. The computer-implemented method of claim 1, further comprising selecting a different subset of character positions in response to an incorrect password attempt.

5. The computer-implemented method of claim 1, wherein the threshold number is between three and ten.

6. The computer-implemented method of claim 1, further comprising:
establishing a machine-authentication character string known to a user;
displaying a character string asserted as being the machine-authentication string;
and receiving verification from the user that the displayed string of characters is the machine-authentication character string prior to prompting for the one or more password attempts.

7. The computer-implemented method of claim 6, wherein the machine-authentication string is pre-selected by the user.

8. A computer program product including a non-transitory computer usable medium storing program code operable to cause a computer to:
receive a series of password attempts;
select a subset of character positions for each password attempt;
for each password attempt, receive an initial portion of the password from a user that precedes a first of the selected subset of character positions and receive the remainder of the password only in response to a correct entry of the initial portion of the password;
prevent more than a threshold number of password attempts having an incorrect character at any of the selected subset of character positions;
allow more than the threshold number of password attempts having an incorrect character only at character positions other than the selected subset of character positions; and
allow access to the electronic content in response to one of the password attempts exactly matching the password.

9. The computer program product of claim 8, further comprising program code operable to cause a computer to allow an unlimited number of password attempts having incorrect characters only at character positions other than the selected subset of character positions.

10. The computer program product of claim 8, further comprising program code operable to cause a computer to, for each password attempt, prompt for the entire password and allow entry of any number of characters as the password attempt.

11. The computer program product of claim 8, further comprising program code operable to cause a computer to select a different subset of character positions in response to an incorrect password attempt.

12. The computer program product of claim 8, further comprising program code operable to cause a computer to: display a character string asserted as being a machine-authentication string known to a user; and receiving verification from the user that the displayed string of characters is the machine-authentication character string prior to prompting for the one or more password attempts.

13. The computer program product of claim 12, wherein the machine-authentication string is pre-selected by the user.

14. The computer program product of claim 8, wherein the threshold number is a number between three and ten.

* * * * *